United States Patent
Cieslar

(10) Patent No.: US 11,572,071 B2
(45) Date of Patent: Feb. 7, 2023

(54) METHOD AND SYSTEM FOR DETERMINING AWARENESS DATA

(71) Applicant: APTIV TECHNOLOGIES LIMITED, St. Michael (BB)

(72) Inventor: Dariusz Cieslar, Cracow (PL)

(73) Assignee: Aptiv Technologies Limited, St. Michael (BB)

(*) Notice: Subject to any disclaimer, the term of this patent is extended or adjusted under 35 U.S.C. 154(b) by 318 days.

(21) Appl. No.: 16/997,027

(22) Filed: Aug. 19, 2020

(65) Prior Publication Data

US 2021/0061287 A1 Mar. 4, 2021

(30) Foreign Application Priority Data

Aug. 29, 2019 (EP) .................................. 19194321

(51) Int. Cl.
*B60W 40/08* (2012.01)
*B60W 60/00* (2020.01)

(52) U.S. Cl.
CPC ........ *B60W 40/08* (2013.01); *B60W 60/0015* (2020.02); *B60W 60/0053* (2020.02); *B60W 60/0059* (2020.02); *B60W 2540/225* (2020.02); *B60W 2540/229* (2020.02); *B60W 2556/10* (2020.02); *B60W 2556/40* (2020.02); *B60W 2556/45* (2020.02)

(58) Field of Classification Search
CPC ............. B60W 40/08; B60W 60/0015; B60W 60/0053; B60W 60/0059; B60W 2540/225; B60W 2540/229; B60W 2556/10; B60W 2556/40; B60W 2556/45
See application file for complete search history.

(56) References Cited

U.S. PATENT DOCUMENTS

| | | | | |
|---|---|---|---|---|
| 8,384,534 | B2* | 2/2013 | James | B60W 50/14 342/107 |
| 10,095,228 | B1* | 10/2018 | Kuffner, Jr. | G05D 1/0088 |
| 10,875,537 | B1* | 12/2020 | Brooks | G06V 20/597 |
| 2011/0169625 | A1 | 7/2011 | James et al. | |
| 2016/0167671 | A1* | 6/2016 | Offenhaeuser | B62D 15/025 340/576 |
| 2018/0129888 | A1* | 5/2018 | Schubert | G06V 20/58 |
| 2019/0038204 | A1* | 2/2019 | Beck | A61B 5/024 |
| 2019/0213429 | A1* | 7/2019 | Sicconi | G06F 3/0346 |
| 2020/0278681 | A1* | 9/2020 | Gier | G05D 1/0246 |

FOREIGN PATENT DOCUMENTS

GB 2441560 A 3/2008

OTHER PUBLICATIONS

Extended European Search Report for Application No. EP 19 19 4321 dated Apr. 3, 2020.
"Foreign Office Action", CN Application No. 202010884242.7, dated Mar. 3, 2022, 20 pages.

* cited by examiner

*Primary Examiner* — Mohamed Barakat
(74) *Attorney, Agent, or Firm* — Sawtooth Patent Group PLLC

(57) ABSTRACT

A computer-implemented method for determining awareness data includes determining occlusion information related to a surrounding of a vehicle, determining a viewing direction of an occupant of the vehicle, and determining awareness data representing the occupant's awareness of the surrounding based on the occlusion information and the viewing direction.

18 Claims, 8 Drawing Sheets

METHOD AND SYSTEM FOR DETERMINING AWARENESS DATA

CROSS REFERENCE TO RELATED APPLICATION

This application claims priority to European Patent Application No. EP 19194321.6, filed on Aug. 29, 2019.

FIELD

The present disclosure relates to methods for determining awareness data. Awareness data represents a vehicle occupant's awareness of the surroundings of the vehicle, for example awareness of the traffic situation in the surroundings, including awareness of objects in the surroundings.

BACKGROUND

Traffic situations may be complex. While an autonomous vehicle may determine various information from sensors to judge a present traffic situation, it may be helpful for the autonomous vehicle to obtain information as to whether an occupant, for example a driver, is aware of the surroundings of the vehicle, including traffic situations in the surroundings of the vehicle.

Accordingly, there is a need for reliably determining whether (or to which degree) an occupant of a vehicle is aware of the surroundings of the vehicle.

SUMMARY

In one aspect, the present disclosure is directed at a computer implemented method for determining awareness data, the method including the following steps carried out by computer hardware components: determining occlusion information related to a surrounding of a vehicle (for example using a perception system which is capable of classifying some components of the environment (e.g. objects or cells in a grid) as visually non observable for the occupant, for example driver); determining a viewing direction of an occupant of the vehicle; and determining awareness data representing the occupant's awareness of the surrounding based on the occlusion information and the viewing direction.

In other words, it may be determined whether (or to which degree) an occupant, for example the driver of a vehicle is aware of the surrounding of the vehicle, for example aware of objects (for example cars, trucks, bicycles, pedestrians, traffic lights, pedestrian's crossings, walls, trees, buildings, and/or roads) in the surrounding or aware of the traffic situation in the surrounding. This determination may be made based on the viewing direction of the occupant. The determination may be made further based on information indicating which portions of the surrounding are occluded (in other words obstructed or hidden), for example because an opaque object is in line of sight.

It will be understood that portions of the surrounding are occluded if the view of that portion is blocked by an object. For example, if an opaque object is located between the occupant and another object, the other object cannot be seen because the line of sight from the occupant to the other object is blocked by the opaque object.

According to another aspect, the occupant's awareness is represented by a probability of awareness. The probability of awareness may indicate a probability that the occupant is aware of the present situation or aware of an object in the surrounding. It will be understood that the probability may be expressed as a real number between 0 and 1 (or between 0% and 100%), but that any other representation may be possible, for example a fuzzy representation, for example with probability levels of "most probably not", "maybe not", "maybe", "most probably yes", or any other representation suitable for indicating a probability.

The probability value may be determined so that, among a plurality of occupants, a ratio of the occupants corresponding to the probability of awareness, would be aware of the surrounding. For example, an awareness probability of 30% may mean that 3 in 10 occupants (i.e. 30% of potential occupants) would be aware of the surrounding given the determined occlusion information and the determined viewing direction. The probability value may also be customized to a specific occupant; for example, if repeatedly after a high awareness probability value has been determined, later it turns out that the occupant actually was not aware of the surrounding, the awareness probability values assigned for that specific occupant (or driver) may generally be reduced compared to other occupants. For that purpose, driver profiles stored in a vehicle may be used to store settings for the awareness probability estimation.

Furthermore, it has been found that an occupant not only can be in states of awareness or non-awareness of the surrounding, but there are states between awareness and non-awareness. The probability of awareness may also be used to express such intermediate states of semi-awareness, and the probability of awareness may indicate a level of awareness.

However, it will be understood that in another example the occupant's awareness may be binary (for example "aware" or "not aware").

According to another aspect, the awareness data may comprise, for each object in a list of objects in a surrounding of the vehicle, a respective level of the occupant's awareness of the object.

The objects in the list of objects may be tracked, so that awareness data related to the surrounding (in other words: data representing the occupant's awareness of the surrounding, for example awareness of the location, speed, direction, classification (for example vehicle, bicycle, pedestrian) of objects in the surrounding may be available even when the object is out of sight of the occupant (but has previously been in line of sight).

According to another aspect, the awareness data comprises a map comprising a plurality of grid cells, each grid cell indicating a level of the occupant's awareness of a traffic situation in the cell. A traffic situation in the cell may include information on objects in the cell.

The map may be a combination of an occupancy map (indicating static objects and/or moving objects in the surrounding of the vehicle) and information indicating for each cell whether the driver is aware of the traffic situation in the cell (or a level or probability of driver awareness of the traffic situation in the cell).

According to another aspect, the awareness data of a present time is determined based on one or more of the following: the occlusion information of the present time, the occlusion information of a past time, the viewing direction of a present time, and the viewing direction of a past time. This may allow taking a history of (automated) object detection band/or history of (human) object viewing into account.

According to another aspect, the awareness data of the present time is determined based on applying a filter to the one or more of the following: the occlusion information of the present time, the occlusion information of the past time, the viewing direction of the present time, and the viewing direction of the past time. According to another aspect, the filter comprises at least one of a low pass filter or a Kalman filter.

According to another aspect, the computer-implemented method further comprises the following step carried out by the computer hardware components: determining, in a state where the vehicle is driving at least partially autonomously, whether to handover full control of the vehicle to the occupant based on the awareness data.

It has been found that safety of a handover is greatly increased if not only information acquired by sensors of the vehicle related to the surrounding of the vehicle is taken into account when determining whether it is safe to handover the vehicle from at least partially autonomous driving to human driving, but if also information on whether the human is aware of the situation in the surrounding of the vehicle is taken into account. For example, if it is determined that the occupant (or driver) is well aware of the (traffic) situation around the vehicle, it may be safe to handover the vehicle to the driver. If it is determined that the occupant is not aware of at least one potentially critical traffic situation, then it may not be safe to handover the vehicle to the driver, and for example a pullover may be initiated, so that the vehicle gets to a stop at the side of the road.

According to another aspect, the computer-implemented method further comprises the following step carried out by the computer hardware components: determining a level of risk of a present traffic situation based on the awareness data.

The level of risk may be provided by a binary value (for example "risky" or "not risky"), a fuzzy value (for example "risky", "most probably risky", "maybe risky", "most probably not risky" or "not risky"), or a probability (for example a real number between 0 and 1 or between 0% and 100%).

It has been found that a level of risk may not only depend on the traffic situation per se, but greatly depends on whether a driver is aware of the traffic situation or not (or to which degree or level a driver is aware of the traffic situation). As such, according to this aspect, the level of risk is determined based on the awareness data.

According to another aspect, the occlusion information is determined based on at least one of proximity sensor data acquired by a proximity sensor (for example laser sensors, lidar sensors, radar sensors, ultrasound sensors, infrared sensors), map information indicating objects in a surrounding of the vehicle, or information transmitted from an external source, for example from other vehicles (for example using V2X (vehicle to everything communication) in a surrounding of the vehicle. For example, the proximity sensor may include or may be at least one of a laser sensor, a lidar sensor, a radar sensor, an infrared sensor, or a camera.

According to another aspect, the occlusion information comprises information indicating that a space behind a detected object is obstructed. Based on the occlusion information, it may be determined that an occupant may not be aware of an object that located is in the occupant's viewing direction, if the object is occluded by another object.

It will be understood that the occlusion information does not need to be binary. For example, there may be objects which do not fully block a view, or there may be objects which only partially occlude an object behind. In such cases, the occlusion information may be represented by an occlusion probability or a degree of occlusion, for example a value between 0 (or 0%) and 1 (or 100%). In another example, the occlusion information may classify the kind of occlusion (for example full occlusion by fully opaque objects, or for example occlusion of a bottom portion (for low objects that occlude bottom portions other objects but don't occlude higher portions of other objects), or occlusion of a top portion (for example of high objects that occlude top portions of other objects but don't occlude lower portions of other objects), or partially opaque occlusion. Furthermore, the level of occlusion may be represented by fuzzy levels of occlusion (for example "fully occluded", "partially occluded", "not occluded").

According to another aspect, the viewing direction is determined based on at least one of a pose of the occupant's head or a pose of at least one of the occupant's eyes.

The pose of the occupant's head or the pose of at least one of the occupant's eyes may be determined by a sensor mounted in the vehicle or a sensor mounted on the occupant's head. The sensor may be an optical sensor, for example a camera, a stereo camera, or a TOF (time-of-flight) system.

According to another aspect, the viewing direction comprises a cone around a viewing axis. It has been found that the actual human vision is most effective in a cone (for example an 8 degree cone) around a (central) viewing axis (in other words gaze direction).

According to another aspect, the current state of the surrounding of the vehicle may be estimated (for example using an object representation or an occupancy grid representation).

In another aspect, the present disclosure is directed at a computer system, said computer system comprising a plurality of computer hardware components configured to carry out several or all steps of the computer implemented method described herein. The computer system may be provided in vehicle. The vehicle may include sensor for determining the viewing direction of the occupant.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Exemplary embodiments and functions of the present disclosure are described herein in conjunction with the following drawings, showing schematically:

DETAILED DESCRIPTION

Figure 1:
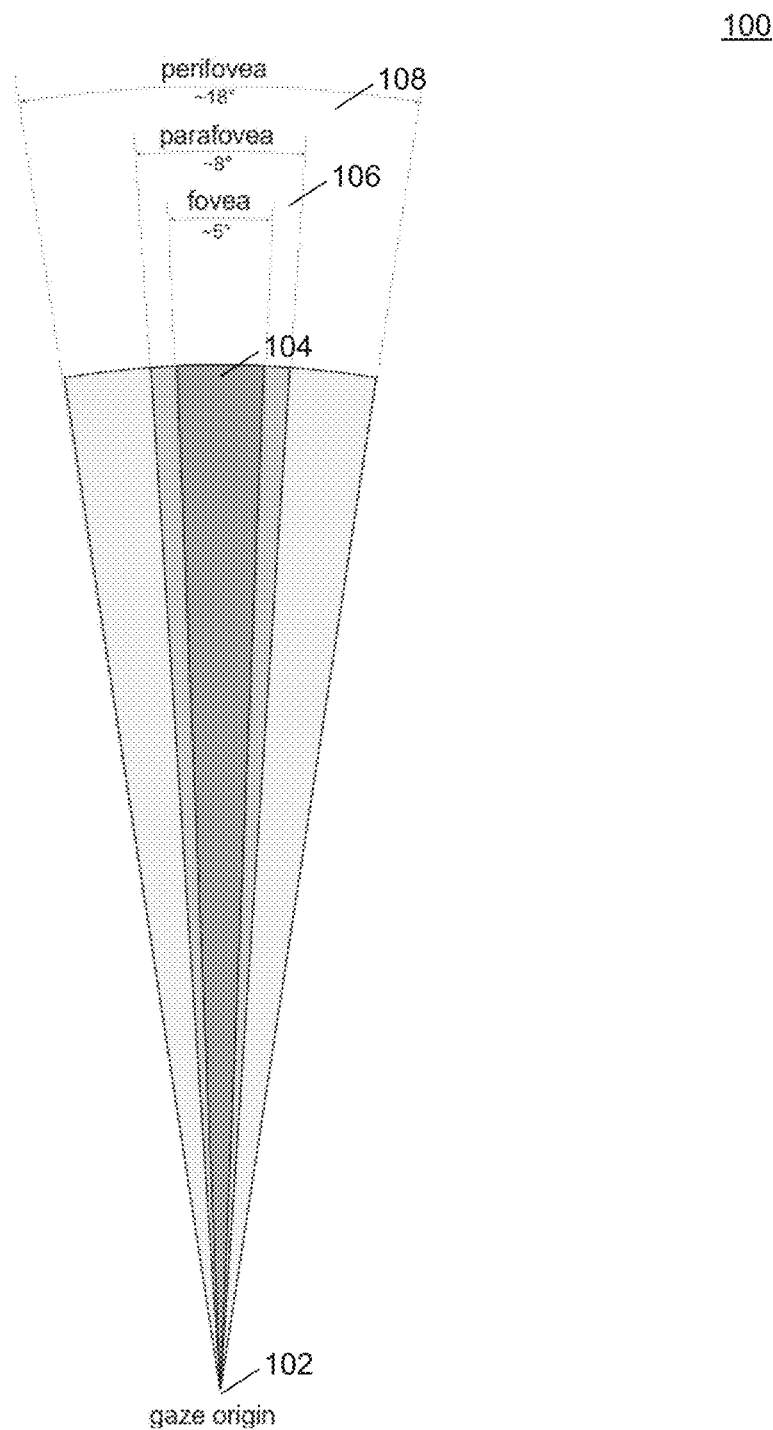
FIG. 1 is an illustration of characteristics of the human visual perception.

FIG. 1 depicts an illustration 100 of characteristics of the human visual perception, which is based on characteristics of fovea 104 and parafovea 106 of the human eye, where scene interpretation is most effective. Information in the parafovea 106 may influence the processing of a scene. In categorization tasks of natural scenes, information from the parafovea 106 may be used to determine the gist of a scene well enough for a categorization and/or judgment, though with reduced sensitivity and speed in comparison to foveal vision. The fovea 104 and parafovea 106 may form the clinical macula. Outside the clinical macula, perifovea 108 and macula may be provided, but may not significantly contribute to the human visual perception. The fovea 104 covers an area of about 5° around a central gaze axis and starting from a gaze origin 102; the parafovea covers an area of about 8°20', and the perifovea covers an area of about 18°20'.

According to various embodiments, gaze estimation (for example estimation of a gaze direction, in other words viewing direction, of a human, for example of an occupant of a vehicle) may be carried out by means of origin and direction. Alternatively, a representation by a gaze focus point may be handled by linking the line of gaze focus point with the center of driver head and treating the resulting line as a gaze direction, and/or using the gaze focus point and/or modeling driver awareness as two dimensional distribution, thus modifying the association criteria between objects and gaze focus point or modifying the inverse sensor model used for grid build up, like will be described in more detail below.

Figure 2:
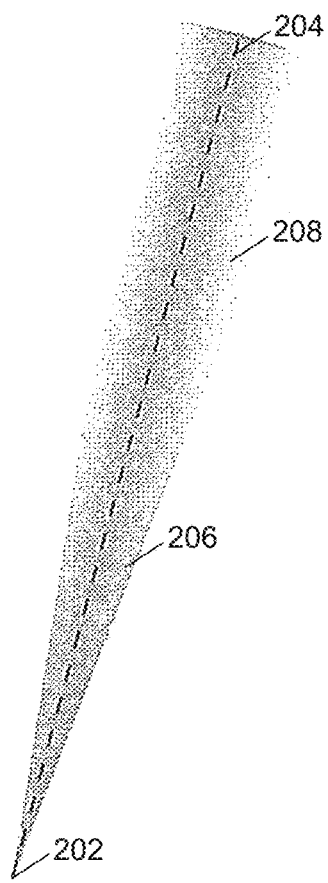
FIG. 2 is an illustration of an estimated gaze direction.

FIG. 2 shows an illustration 200 of an estimated gaze direction. An origin 202 of the gaze may be considered as the starting point for a main gaze direction 204. An area (for example a cone 206 of 8 degree, corresponding to the angular range of the parafovea perception) is illustrated. As further illustrated, at a distance above a pre-determined distance, not the full 8 degree cone 206, but a limited area 208 is considered as the area that is encompassed by the gaze. It will be understood that the gaze direction may be affected by mirrors of the vehicle.

For example, the gaze direction may be determined using a driver monitoring camera or a head mounted gaze tracker, which may also monitor a driver state (for example eyes open, or rate of blinking) and user experience (UX, e.g. control of infotainment). The driver monitoring camera may estimate the driver's head angle and gaze direction.

According to various embodiments, an estimate for gaze origin, an estimate for gaze direction, and/or an estimate for gaze focus point may be determined. The origin (in other words: estimated gaze origin), the direction (in other words: estimated gaze direction) and the focus point (in other words: estimated gaze direction) may be provided in a 2D plane (XY) coordinate system or 3D (XYZ) coordinate system. The inaccuracy of the gaze estimate (which may include the estimate for gaze origin, the estimate for gaze direction, and/or the estimate for gaze focus point) may be provided.

According to various embodiments, the gaze direction estimate may be integrated with object tracking. This may allow tracking of an occupant's awareness (for example a driver's awareness) about objects perceived by the perception system of a vehicle. For example, an object tracker may, besides the input from sensors (for example proximity sensors, for example laser sensors, lidar sensors, radar sensors, ultrasound sensors, infrared sensors, or V2X (vehicle to everything communication, i.e. information received in the vehicle from an external source, for example from another vehicle or from an external sensor)) for the object-tracking, further process gaze information (which may for example include gaze origin, gaze direction, gaze focus point, mirror positions, and/or minor angles). For each tracked object, an awareness probability may be determined, for example as a function of angular distance from the object to the line of gaze direction and/or gaze focus point and an occlusion level by another object in the line of sight (in other words: in a line from the occupant's position to the other object).

Figure 3:
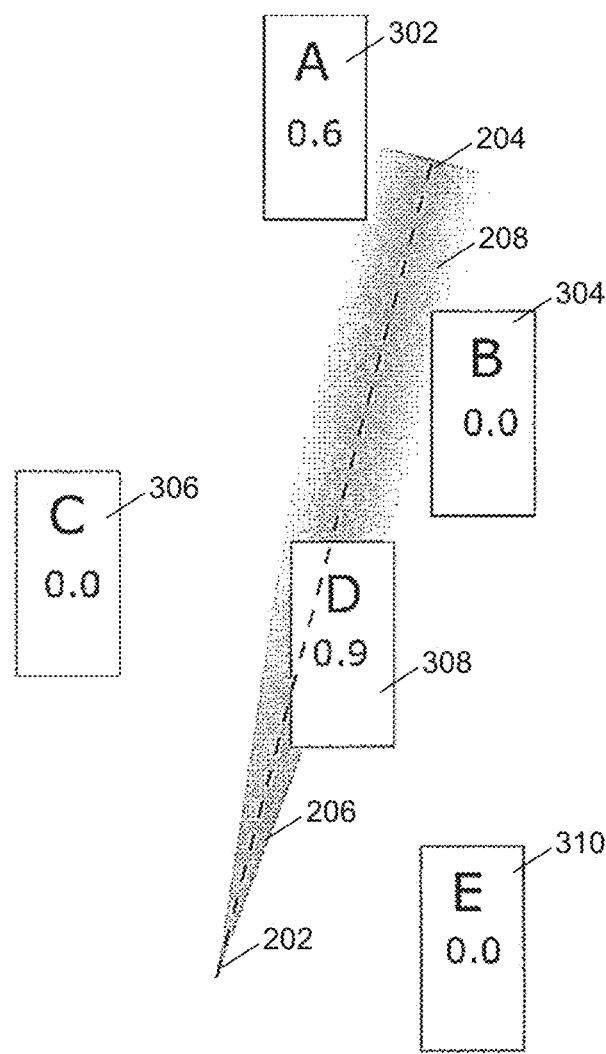
FIG. 3 is an illustration of results of instantaneous awareness estimation according to various embodiments.

FIG. 3 shows an illustration 300 of results of instantaneous awareness estimation (in other words: awareness information only at the present instance of time, without taking into account a history of awareness information and without taking into account a history of gaze estimation) according to various embodiments. For illustrative purposes, the gaze estimation may provide the gaze origin 202 and the gaze direction 204 like illustrated in FIG. 2. A first object 302 (which may be referred to as object A) may be close to the gaze direction 202 and the far gaze area 208, and therefore, for example based on evaluation of an angular distance between gaze direction 202 and the nearest point of the first object 302 to the gaze direction 202, an occupant's awareness of the first object 302 may be indicated by a medium awareness level, for example an awareness level of 60%. A second object 304 (which may be referred to as object B) may be completely occluded (for example by a fourth object 308), and therefore, the occupant's awareness of the second object 304 may be indicated by an awareness level of 0%. A third object 306 (which may be referred to as object C) may not be associated (in other words: may be outside the gaze, for example outside the gaze areas 206, 208, for example more than a pre-determined threshold (for example 8 degrees) away from the gaze direction 204), and therefore, the occupant's awareness of the third object 306 may be indicated by an awareness level of 0%. The fourth object 308 (which may be referred to as object D) may lie on the gaze line (for example may lie on the line through the gaze origin 202 and having a direction of the gaze direction 204, or may lie close to this line) and may not be occluded, and therefore, the occupant's awareness of the fourth object 308 may be indicated by a high awareness level, for example an awareness level of 90%. A fifth object 310 (which may be referred to as object E) may not be associated (in other words: may be outside the gaze, for example outside the gaze areas 206, 208, for example more than a pre-determined threshold (for example 8 degrees) away from the gaze direction 204), and therefore, the occupant's awareness of the fifth object 310 may be indicated by an awareness level of 0%.

According to various embodiments, the awareness level (in other words: awareness probability) may be accumulated over time for each object.

The accumulated awareness probability may be reduced (in other words: decayed) whenever the object is not associated with line of gaze direction, and/or whenever the object has been perceived by a vehicle to move significantly relative to the host (for example relative to the vehicle or relative to the occupant of the vehicle), and/or the object has become occluded (in other words: obstructed).

Figure 4:
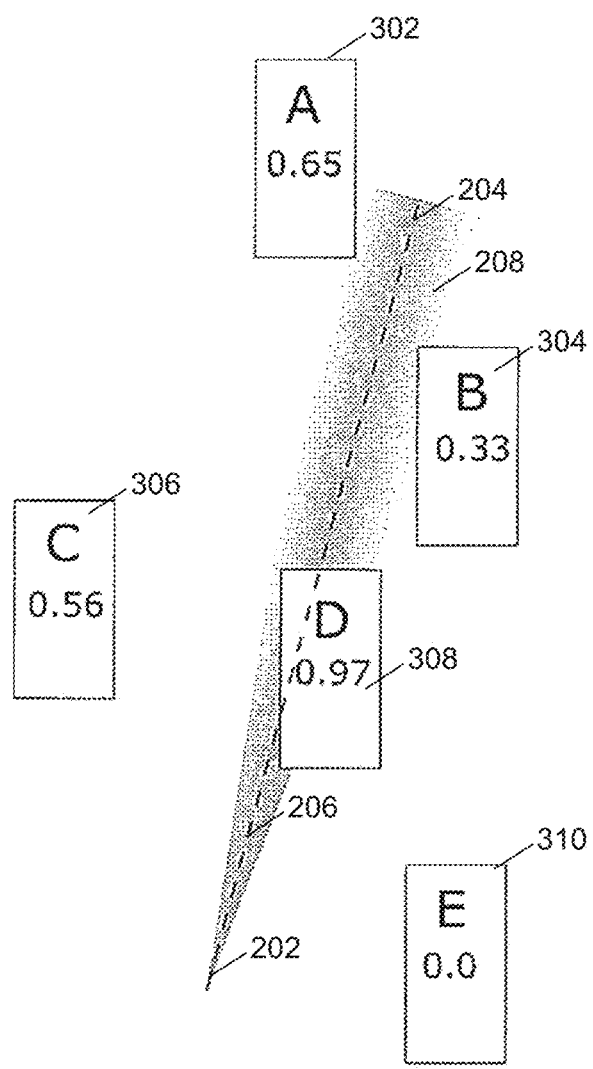
FIG. 4 is an illustration of results of time-filtered awareness estimation according to various embodiments.

FIG. 4 shows an illustration 400 of results of time-filtered awareness estimation (in other words: awareness information at the present instance of time, wherein a history of awareness information and/or a history of gaze estimation has been taken into account) according to various embodiments. The first object 302 is seen in the past and seen now, but it is some distance away from the gaze direction 204, and therefore may be assigned a medium awareness level, for example an awareness level of 65%. The second object 304 is currently occluded but was seen in the past, and therefore may be assigned a low awareness level, but an awareness level of more than 0, for example an awareness level of 33%. The third object 306 was seen in the past, and is currently not observed, but is now far away from the gaze direction, and may therefore may be assigned a medium awareness level, for example an awareness level of 56%. The fourth object 308 is seen currently and was seen in the past, and therefore may be assigned a high awareness level, for example an awareness level of 97%. The fifth object 310 has never been seen (and is not seen now), and thus may be assigned an awareness level of 0.

According to various embodiments, the gaze direction may be an input to the object tracker. Compared to post-processing of an object list (where first the objects are tracked, and then each object is assigned an awareness level), with the gaze direction being an input to the object tracker, the driver awareness of an object may be tracked over time, even when the object disappears from the output interface (in other words: even when the object has not been prioritized/downselected for communication by a tracking algorithm, such prioritization/downselection is often required due to a limited output interface bandwidth or in multi-hypothesis tracking approaches). Since the object detection according to various embodiments provides the driver awareness continuously, the driver awareness information may be available any time (for example after a handover trigger), which may allow a hot-start of information transfer to a driver.

According to various embodiments, the gaze direction estimate may be integrated with an occupancy grid. This may allow tracking of an occupant's (for example driver's) awareness of a vehicle surrounding that includes (occluded) areas that cannot be explored visually. The instantaneous results of gaze estimator may be interpreted as a version of forward sensor models in occupancy grid framework to build up and track a grid of areas believed to be visually explored by a driver. An adaptation of Bresenham's line algorithm can be utilized to determine the indices of cells lying under a cone of gaze. Depending on the exact formulation of awareness probability as a function of gaze direction (see FIG. 2) a value of awareness probability can be assigned to each of the cells covered by a significant awareness probability.

An occupancy grid may, for each cell (corresponding to an area in the surrounding of the vehicle) of the grid, provide an estimate as to whether the area is occupied, free or occluded, and may also indicate unexplored areas (in other words: areas or cells for which no information has been acquired and which therefore cannot be classified as occupied, free or occluded), for example based on automotive perception sensors (for example radar, lidar, vision, V2X (vehicle to everything communication, i.e. information received in the vehicle from an external source, for example from another vehicle or from an external sensor)). The occupancy grid may be used to estimate areas that cannot be explored by the driver (e.g. occluded by moving objects, for example other vehicles, or by static objects, for example walls). A cell may be estimated as visually explored if the occupancy grid classified it as explorable by the driver (in other words: as not occluded) and has been swept by the driver's gaze, wherein the driver's gaze may be conditioned on visual obstacles extracted from the grid (for example Dempster-Shafer theory (DST) grid or occupancy grid). The expression "the driver's gaze is conditioned on visual obstacles" refers to conditional probability: the awareness probability of a cell is different depending on whether the cell of the occupancy grid has been classified as visually explorable or not, so that a conditional probability under the assumption of the cell being visually explorable or under the assumption of the cell not being visually explorable may be determined (depending on whether or not the cell is visually explorable; in other words: depending on whether or not the cell is not occluded).

According to various embodiments, the awareness probability (in other words: awareness level) may be accumulated over time. In some examples, cells occupied with stationary objects may not be decayed, but decay may be applied for cells occupied by movable objects.

Figure 5:
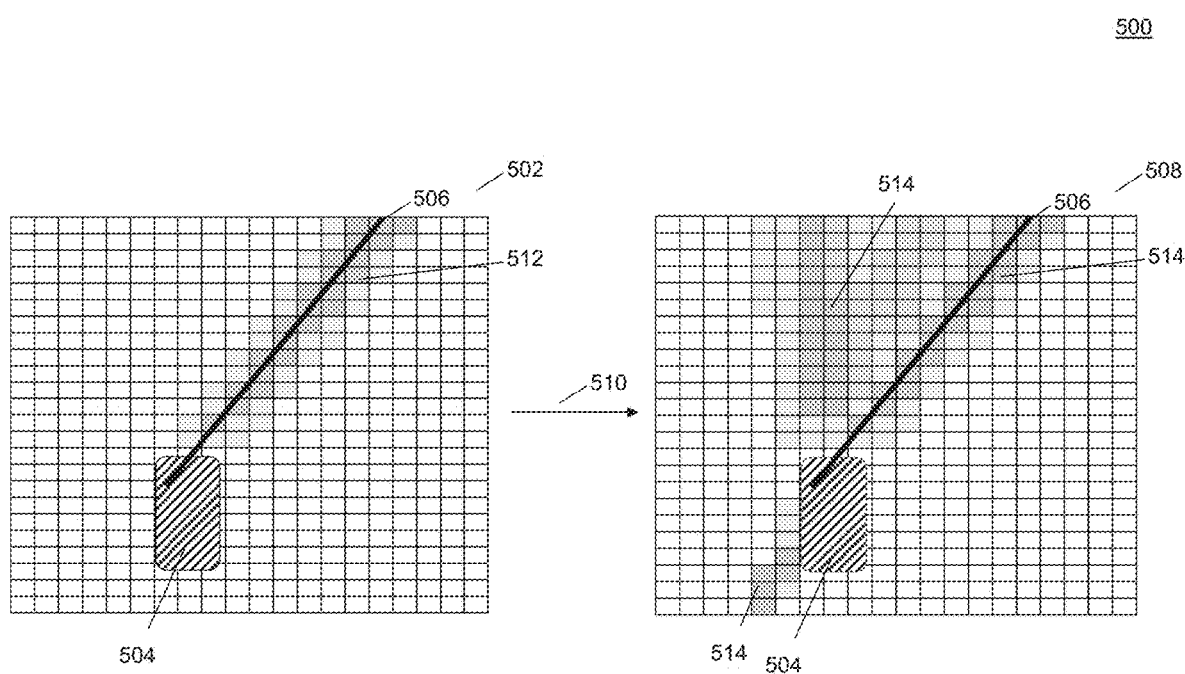
FIG. 5 is an illustration of an instantaneous gaze grid, and an accumulated gaze grid according to various embodiments.

FIG. 5 shows an illustration 500 of an instantaneous gaze grid 502 (in which a vehicle 504 and a gaze direction 506 are illustrated), and an accumulated gaze grid 508, which may be obtained based on a plurality of instantaneous gaze grid over a plurality of time steps, using grid accumulation and decay, like illustrated by arrow 510 according to various embodiments. Probabilities of awareness are illustrated by shading the respective cells in the grids, wherein white cells indicate a probability of zero, and darker cells illustrate higher probabilities. It can be seen that in the instantaneous gaze grid 502, the probability of awareness is higher than zero only in a small region 512 around the gaze direction 506 (for example corresponding to the parafovea). Cells of the accumulated gaze grid 508 have non-zero probabilities of awareness in cells 514 beyond those of the instantaneous gaze grid 502 (in particular beyond the present gaze direction 506) due to accumulation and decay of previously registered instantaneous gaze grids.

Figure 6:
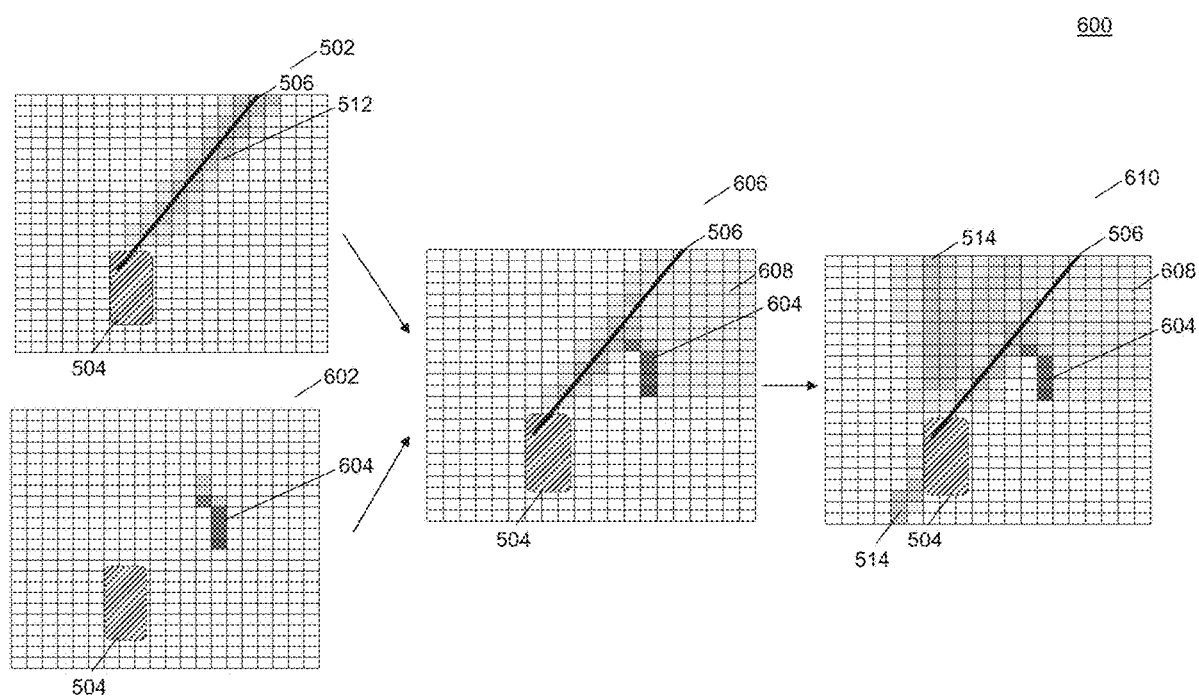
FIG. 6 is an illustration of integrating the instantaneous gaze grid with an occupancy grid according to various embodiments.

FIG. 6 shows an illustration 600 of integrating the instantaneous gaze grid 502 with an occupancy grid 602 (in other words: DST grid), in which objects 604 are illustrated, to obtain a gaze grid 606 conditioned on the DST grid, according to various embodiments. Based on the gaze direction 506, an area 608 behind the objects 604 may be marked as occluded or invisible. The gaze grid 606 conditioned on the DST grid may be accumulated and decayed, to take into account a history of object location, occlusion information, and gaze estimation, and thus an accumulated gaze grid 610 conditioned on the DST grid may be provided.

It will be understood that the gaze grid 502 may be accumulated and decayed, like illustrated in FIG. 5, and may then be integrated with the occupancy map 602. Alternatively, the gaze grid 502 may be integrated with the occupancy map 602, and the integrated map (in other words: the gaze grid 602 conditioned on DST grid) may be accumulated and decayed, like illustrated in FIG. 6.

According to various embodiments, a method (which may also be referred to as a protocol) for information transfer during vehicle control handover may be provided. This may ensure that the driver is aware of a traffic situation before the handover actually occurs, and ensures that critical information (which may be critical for the driver to take over control of the vehicle) is not omitted.

Situational assessment of a perceived road situation may be used to classify and prioritize information items that need to be communicated to the driver (e.g. object in blind spot or object with low values of estimated time-to-collision). The methods described above may provide hot starting awareness estimation (for example an estimation whether the driver is already aware of several items, e.g. has already observed the vehicle that is currently in blind spot). The driver may be required to confirm each communicated item (for example object or area recommended for checking) as a condition for transitioning to manual control of the vehicle (in other words: as a condition for handover). Driver sensing may be used for ergonomics; for example, the driver may confirm the awareness of a communicated item by nodding.

Figure 7:
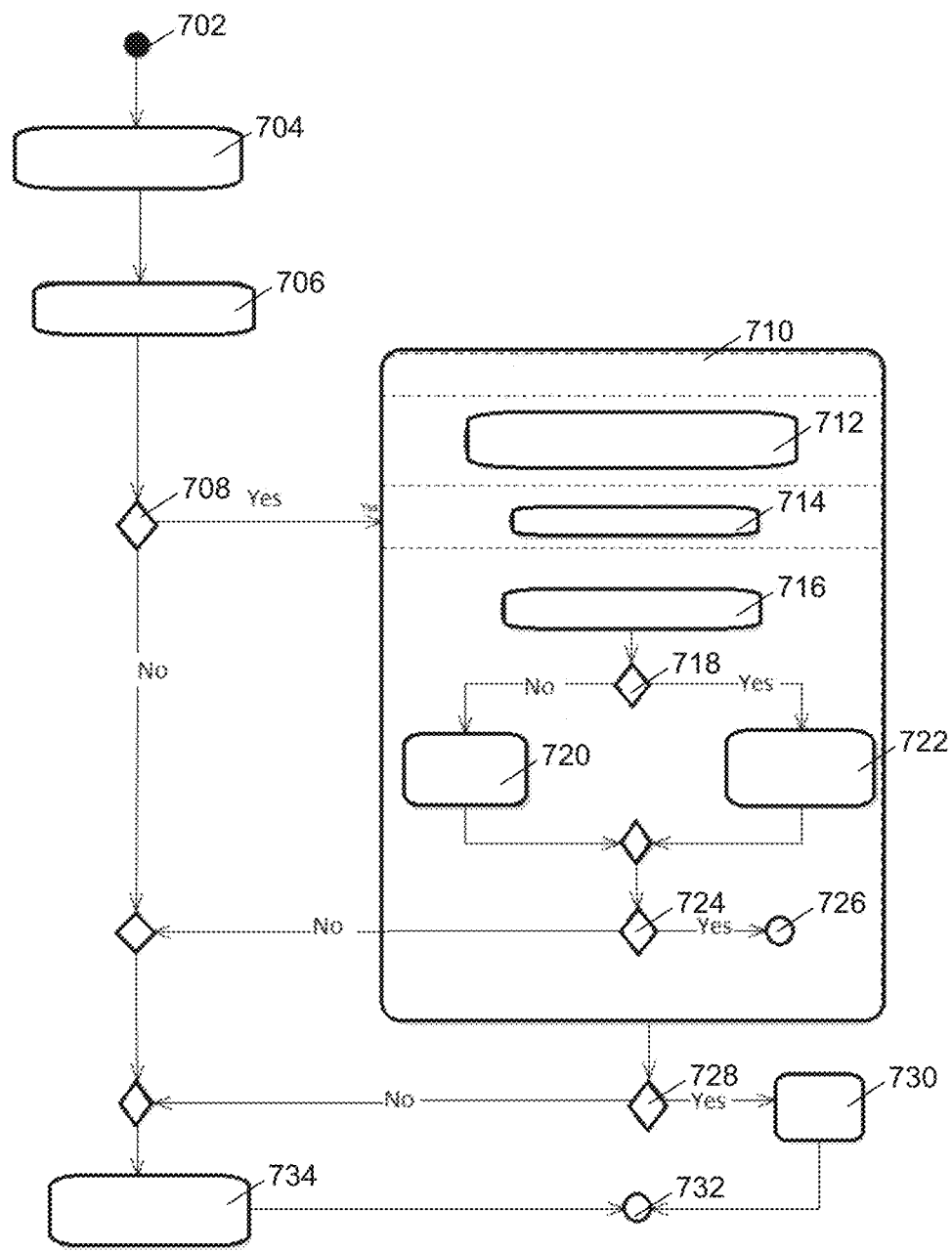
FIG. 7 is a flow diagram illustrating a method for handover according to various embodiments.

FIG. 7 shows a flow diagram 700 illustrating a method for handover according to various embodiments. At step 702, the method may be initialized. At step 704, the driver may be warned about initiation of handover. At step 706, a main display of the vehicle may be switched to control handover mode. At step 708, it may be determined whether the driver state is satisfactory (for example, it may be determined whether the driver is awake). If it is determined that the driver state is satisfactory, processing may proceed at step 710 that controls the transfer of information to a driver or occupant. If it is determined that the driver state is not satisfactory, processing may proceed at step 734. At step 710, a loop for each information item may be started, wherein the loop may include the setup step of 712, the end condition of 714, and transfer of each critical information item by steps 716, 718, 720, 722, 724, and 726. At step 712, situational assessment may be used to identify critical information items and sort them from most critical to least critical. The end condition is described by 714, where it may be checked if all critical items were successfully transferred to the driver and were confirmed. At step 716, the current item may be communicated via the available HMI, for example a visual display. At step 718, it may be determined whether the item is observable by sight. If it is determined that the item is observable by sight, processing may proceed at step 722. If it is determined that the item is not observable by sight, processing may proceed at step 720. At step 720, it may be waited for an explicit manual confirmation by the driver about the awareness of that particular critical information item. At step 722, the driver awareness estimator may be applied until a sufficient threshold of awareness is achieved. The wait time may be limited, for example to 1 second. Alternatively an explicit driver confirmation may be accepted, for example in detection of that the driver nodded. At step 724, it may be determined whether the transfer of the current critical information item was successful in sufficient time. If it is determined that the verification was successful in sufficient time, processing may proceed at step 726 finishing the transfer of the current information item and proceeding to the next iteration of the loop over all critical items. If it is determined that the verification was not successful in sufficient time, processing may proceed at step 734. At step 726, process may end for the loop, and processing may continue at step 728. At step 728, it may be determined whether the driver engages (in other words touches or controls) the vehicle control instruments. If it is determined that the driver engages the vehicle control instruments, processing may proceed at step 730. If it is determined that the driver does not engage with the vehicle control instruments, processing may proceed at step 734. At step 730, the vehicle may be handed over to the driver. At step 734, a minimum risk maneuver may be initiated. Processing may end at step 732.

According to various embodiments, driver alertness estimation may be provided. It may be ensured that (or determined whether) the driver is alert. Situational assessment may be used to identify occurrences of events that can be classified as medium risk. The previously described methods for driver awareness estimation of perceived objects as well as visual field exploration in the form of grid may be used to check whether driver has reacted to such events by visually exploring the area/object of relevant to the event. If statistics of driver reaction to such events falls below a calibratable threshold, the driver may be classified as inattentive.

As described above, methods for the integration of driver gaze tracking with automotive external environment perception may be provided.

According to various embodiments, methods of augmenting perception methods or filters with gaze direction estimates may provide an effective combination of gaze tracking with artificial external environment perception.

According to various embodiments, methods for tracking of visual observation by a driver of all perceived traffic objects, for grid based representation of visually explored areas, and for conditioning of grid based representation on occupancy grids may evaluate the lack of driver awareness about a particular driving situation.

According to various embodiments, a prioritized procedure for machine-human communication requiring driver confirmation may ensure that an automated vehicle is not released to a driver prior to verifying the driver's awareness of critical traffic conditions.

According to various embodiments, it may be verified if occurrences of threat events in a vehicle surrounding attracted a driver's attention based on driver state estimation (for example based on driver alertness estimation).

Figure 8:
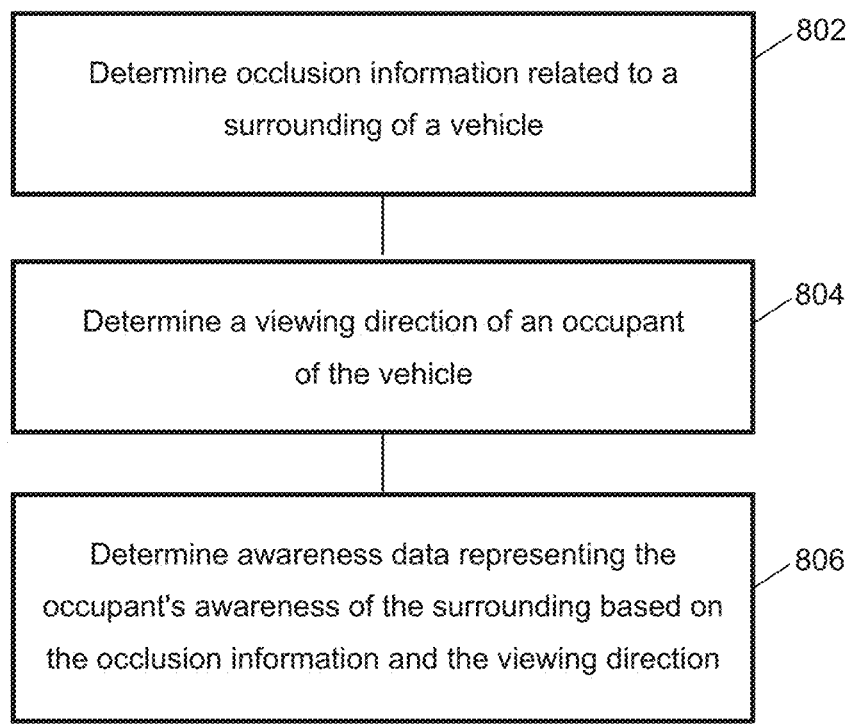
FIG. 8 is a flow diagram illustrating a method for determining awareness data according to various embodiments.

FIG. 8 shows a flow diagram 800 illustrating a method for determining awareness data according to various embodiments. At 802, occlusion information related to a surrounding of a vehicle may be determined. At 804, a viewing direction of an occupant of the vehicle may be determined. At 806, awareness data representing the occupant's awareness of the surrounding may be determined based on the occlusion information and the viewing direction.

The occupant's awareness may be represented by a probability of awareness.

The awareness data may include or may be, for each object in a list of objects in a surrounding of the vehicle, a respective level (or probability) of the occupant's awareness of the object.

The awareness data may include or may be a map which includes a plurality of grid cells, each grid cell indicating a level of the occupant's awareness of a traffic situation in the cell.

The awareness data of a present time may be determined based on one or more of the following: the occlusion information of the present time, the occlusion information of a past time, the viewing direction of a present time, and the viewing direction of a past time.

The awareness data of the present time may be determined based on applying a filter to the one or more of the following: the occlusion information of the present time, the occlusion information of the past time, the viewing direction of the present time, and the viewing direction of the past time.

The filter may include or may be at least one of a low pass filter or a Kalman filter.

The method may further include determining, in a state where the vehicle is driving at least partially autonomously, whether to handover full control of the vehicle to the occupant based on the awareness data.

The method may further include determining a level of risk of a present traffic situation based on the awareness data.

The occlusion information may be determined based on at least one of proximity sensor data acquired by a proximity sensor, map information indicating objects in a surrounding of the vehicle, or information transmitted from other vehicles in a surrounding of the vehicle.

The occlusion information may include or may be information indicating that a space behind a detected object is obstructed.

The viewing direction may be determined based on at least one of a pose of the occupant's head or a pose of at least one of the occupant's eyes.

The viewing direction may include or may be a cone around a viewing axis.

Each of the steps 802, 804, 806 and the further steps described above may be performed by computer hardware components.

The preceding description is illustrative rather than limiting in nature. Variations and modifications may become apparent to those skilled in the art based on the above description. The scope of legal protection provided to the invention can only be determined by studying the following claims.

I claim:

1. A computer-implemented method for determining awareness data, the method comprising the following steps carried out by computer hardware components:
    determining occlusion information related to a surrounding of a vehicle including information indicating that a space behind a detected object is obstructed;
    determining a viewing direction of an occupant of the vehicle; and
    determining, based on the occlusion information and the viewing direction, awareness data representing a measurement of occupant awareness of the surrounding and that the space behind the detected object is obstructed by determining the awareness data for a present time based on the occlusion information for the present time, the viewing direction for the present time, and at least one of the occlusion information for a past time or the viewing direction for the past time.

2. The computer-implemented method of claim 1, wherein the measurement of occupant awareness is represented by a probability of awareness of the surrounding and that the space behind the detected object is obstructed.

3. The computer-implemented method of claim 1, wherein the awareness data comprises, for each object in a list of objects in the surrounding of the vehicle, a respective level of the measurement of occupant awareness of that object.

4. The computer-implemented method of claim 1, wherein the awareness data comprises a map comprising a plurality of grid cells, each grid cell indicating a level of the measurement of occupant awareness of a traffic situation in that cell.

5. The computer-implemented method of claim 1, wherein the awareness data of the present time is determined based on applying a filter to one or more of the following:
    the occlusion information for the present time,
    the occlusion information for the past time,
    the viewing direction for the present time, and
    the viewing direction for the past time.

6. The computer-implemented method of claim 5, wherein the filter comprises at least one of a low pass filter or a Kalman filter.

7. The computer-implemented method of claim 1, further comprising:
    determining, in a state where the vehicle is driving at least partially autonomously, whether to handover full control of the vehicle to the occupant based on the awareness data.

8. The computer-implemented method of claim 1, further comprising:
    determining a level of risk of a present traffic situation based on the awareness data.

9. The computer-implemented method of claim 1, wherein the occlusion information is determined based on at least one of proximity sensor data acquired by a proximity sensor, map information indicating objects in a surrounding of the vehicle, or information transmitted from other vehicles in the surrounding of the vehicle.

10. The computer-implemented method of claim 1, wherein the viewing direction is determined based on at least one of a pose of a head or at least one eye of the occupant.

11. The computer-implemented method of claim 1, wherein the viewing direction comprises a cone around a viewing axis.

12. The computer-implemented method of claim 1, wherein the measurement of occupant awareness comprises a numerical value indicating a level of occupant awareness between two possible awareness levels.

13. A computer system comprising a plurality of computer hardware components configured to:
    determine occlusion information related to a surrounding of a vehicle including information indicating that a space behind a detected object is obstructed;
    determine a viewing direction of an occupant of the vehicle; and
    determine, based on the occlusion information and the viewing direction, awareness data representing a measurement of occupant awareness of the surrounding and that the space behind the detected object is obstructed, wherein the awareness data is determined for a present time based on the occlusion information for the present time, the viewing direction for the present time, and at least one of the occlusion information for a past time or the viewing direction for the past time.

14. A non-transitory computer readable medium comprising instructions, that when executed by a computer, cause the computer to:
    determine occlusion information related to a surrounding of a vehicle including information indicating that a space behind a detected object is obstructed;
    determine a viewing direction of an occupant of the vehicle; and
    determine, based on the occlusion information and the viewing direction, awareness data representing a measurement of occupant awareness of the surrounding and that the space behind the detected object is obstructed to determine the awareness data for a present time based on the occlusion information and the viewing direction for the present time and at least one of the occlusion information for a past time or the viewing direction for the past time.

15. The non-transitory computer readable medium of claim 14, wherein execution of the instructions further causes the computer to determine the awareness data for the present time based on the occlusion information and the viewing direction for the present time and the occlusion information for the past time and the viewing direction for the past time.

16. The non-transitory computer readable medium of claim 14, wherein execution of the instructions further causes the computer to determine the awareness data for the present time based on applying a filter to the occlusion information for the present time.

17. The non-transitory computer readable medium of claim 16, wherein execution of the instructions further causes the computer to determine the awareness data for the present time based further on applying the filter to the occlusion information for the past time.

18. The non-transitory computer readable medium of claim 17, wherein execution of the instructions further causes the computer to determine the awareness data for the present time based further on applying the filter to at least one of the viewing direction for the present time or the viewing direction for the past time.

* * * * *